Feb. 11, 1936.  H. L. WALKER  2,030,667

SCALE

Filed Jan. 19, 1933

INVENTOR.
HAROLD L. WALKER,
BY Duell, Dunn & Anderson
ATTORNEYS.

Patented Feb. 11, 1936

2,030,667

UNITED STATES PATENT OFFICE 2,030,667

SCALE

Harold L. Walker, Brooklyn, N. Y., assignor to The Jacobs Bros. Co. Inc., Brooklyn, N. Y., a corporation of New York Application January 19, 1933, Serial No. 652,457

8 Claims. (Cl. 265—39)

This invention relates to a structurally and functionally improved scale, and in its more specific aspects aims to provide a scale primarily adapted for the evaluating of commodities, whether such evaluation takes the form of price, or, for example, cost of shipment of the commodity.

It is an object of the invention to provide an apparatus of this character which may be used by a relatively unskilled person and with minimum danger of error occurring.

A further object of the invention is that of constructing a scale in which the evaluations aforementioned may be arrived at with minimum effort and in which after completion of the same the apparatus will restore itself substantially automatically to normal condition so as to be ready for a succeeding functioning.

Another object is that of furnishing a scale which will embody relatively few parts, each individually simple and rugged in construction, these parts being capable of manufacture largely by automatic machinery and assembly by relatively unskilled labor to provide an apparatus functioning over long periods of time with freedom from difficulties.

The present invention also contemplates an apparatus which may be embodied in a scale at the time of the manufacture thereof, or which may be associated with an already existing structure in order that the benefits of the present invention may be derived therefrom.

With these and other objects in mind, reference is had to the attached sheet of drawing illustrating one practical embodiment of the invention and in which.

In the illustrated embodiment the invention has been shown in association with a scale of the postal type. In other words, the weight value of the commodity is shown and the registering mechanism also indicates the postage required to ship the article various distances. While in many aspects the invention is primarily designed for use in this connection, it will be understood by those skilled in the art that its teachings might be advantageously employed in various other associations.

Figure 1:
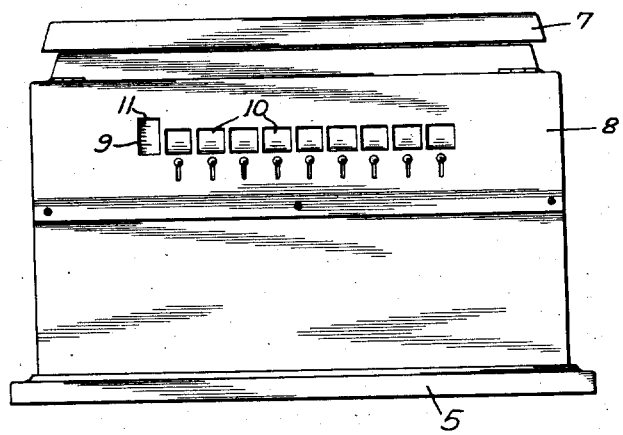
Fig. 1 is a front elevation.
Figure 2:
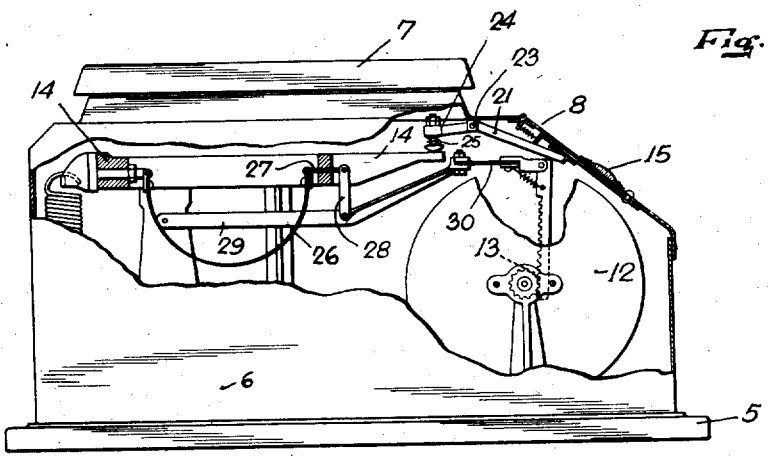
Fig. 2 is a side elevation with certain of the parts broken away to disclose underlying construction and Fig. 3 is an enlarged sectional fragmentary view of certain of the parts, as shown in Fig. 2.

Referring primarily to Figs. 1 and 2, the numeral 5 indicates the scale base from which a casing 6 extends upwardly and above which a platform 7 is supported by means of suitable mechanism (not shown). Suffice it to say that this mechanism may be of numerous desired types and that it includes a factor which will, for example, increasingly resist downward movements of the platform 7 incident to loads being imposed upon the latter.

Adjacent its forward end the casing is provided with a preferably sloping portion or panel 8 and this panel may be pierced to provide a sight opening or window 9 and a series of those openings 10. Through the first opening the weight value of the commodity may be observed by viewing the subdivisions 11 of a dial which are properly graduated to permit of this result obtaining. Through the openings or windows 10 other graduations, in the present instance indicative of postal rates, may be viewed, and these latter graduations are of course arranged in zones or areas, one of which will be visible through each of the openings 10. It is also obvious that the openings 10 may be identified as corresponding, for example, to various postal zones, and that all of the graduations aforementioned are suitably affixed or inscribed upon the face of a drum 12 disposed within the casing.

This drum forms—in the usual manner—one part of the registry mechanism and is actuated, for example, by a rack and pinion structure 13, which is in turn connected to one of the movable beams 14 of the scale mechanism. Each of the windows or openings 9 and 10 may be provided with a lens 15, if desired, so that the graduations or other indicia appearing upon the face of the drum may be read with facility.

In order that no error may occur, it is proposed—according to the present invention—that only that area or portion of the registering mechanism which should be considered in any given instance will be visible to the operator. With this in mind the openings 10 are normally covered. This may be effected, according to the illustrated embodiment of the invention, by, for example, having these openings normally covered by slides 16 disposed one below each of the openings 10 and mounted, for example, by pin and slot connections 17 to have guided movements. Each of the slides may have an opening 18 of sufficient area that when in registry with the adjacent opening 10, there will be no obstruction to vision. It will also be observed that each of the slides or plates 16 is normally maintained in opening-covering position by utilizing a spring 19 individual to such slide and which normally tends to effect the result desired. Each plate or slide 16 has an outstanding portion or strip 20 which, in cooperation with the arm of a lever 21, prevents the slide from moving beyond the position shown in Fig. 3. This element is also formed with a further outstanding portion or ledge 22 which may be engaged by the end of the lever 21 to maintain the plate in a position in which the operator may freely look through the opening 10. It is thus obvious that an operator, either before or after placing a commodity upon the platform 7, may identify the point of destination of the article and after determining, for example, the zone in which such point of destination occurs, may depress or shift the corresponding plate 16 by means of its pin 17. Under these circumstances it is patent that the lever 21 will simply ride over the outstanding portion 22 and come to lie beyond the same to prevent accidental reshifting of the plate. The lever will function in this manner due to the fact that it is pivotally supported as at 23 and has a second arm 24 of greater weight value than that arm which engages the outstanding portions 20 and 22. In view of the fact that the operator will not see any portion of the registering mechanism other than that identified with the particular zone which he is considering, it is apparent that errors will be reduced to a minimum, if not entirely eliminated.

Figure 3:
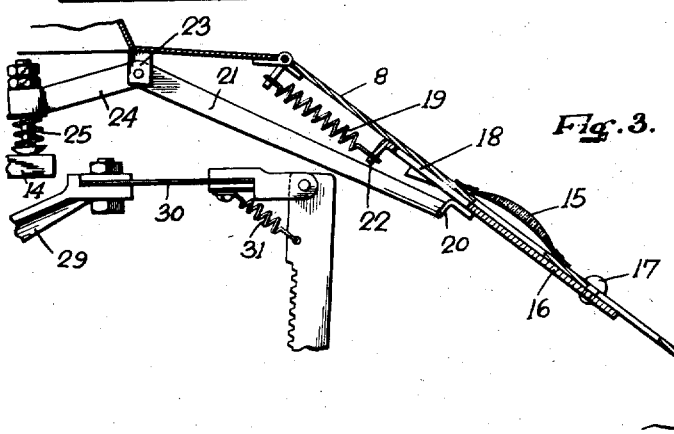

Now, in order to automatically return the slide 16 to the position shown in Figs. 2 and 3, it will be noted that the lever 24 mounts a yielding contact member 25, which cooperates, for example, with the outer end of the beam 14. With no load upon the platform 7, the parts will be in the position illustrated and with such load imposed to depress the platform, and accordingly the beam 14, it is apparent that the contact member 25 will no longer engage the latter and accordingly the entire weight of the beam arm 24 will serve to maintain proper cooperation between the arm 21 and the parts which it is to engage. However, upon the article being lifted from the platform 7, it is recognized that the latter will move, not alone to the neutral position illustrated in Figs. 1 and 2, but will actually move to a position beyond zero. The contact member 25 will be adjusted so that small accidental shiftings of the platform will produce no effect but, for example, that if the platform passes through neutral position with a force of—4 ounces, then the beam 14 in its upward swing, will cause elevation of the lever arm 24 with a consequent depression of the arm 21, and release of the slide 16 so that the latter may again occupy its normal opening-covering position.

In this manner it will be apparent that after each operation of the scale the parts will be reset. Obviously, any desired force might be established for causing shifting of the lever and according to the work the scale would be called upon to perform. It is also apparent that the scale may not necessarily be limited to use in connection with postal shipments but might be employed in numerous other associations. It will also be appreciated that while a single double armed lever 21—24 has been shown, a separate lever might be provided for each cover plate.

It will of course be appreciated that the structure particularly illustrated in Fig. 2 might be modified in many respects. It is preferred, however, that this structure be generally adhered to. As will be observed in this figure, the main beam or lever 14 carries a thermostatic strip 26 which is connected by a rod 27 to a link 28. The latter connects to the sub-lever 29, which is the element to which the rack bar is coupled. Such coupling, as illustrated, may take the form of a flexion strip 30, to the outer end of which the rack bar is pivotally secured, and between which elements a spring 31 is positioned to assure a constant engagement between the teeth of the rack and the pinion. As a consequence of this structure it will be appreciated that as the thermostat contracts and expands incident to temperature changes, the operating fulcrum of sub-lever 29 will in effect be modified to correspondingly modify the throw of the rack-bar and thus compensate for temperature variations.

In conclusion, it is obvious that numerous changes in construction and rearrangements of the parts might be resorted to without departing from the spirit of the invention as defined by the claims.

After having described my invention, what I claim as new and desire to secure by Letters Patent, is:

1. A scale including a load receiving member, a registering mechanism connected thereto and responsive to the movements thereof, a cover member extending adjacent said registering mechanism and occupying a position to conceal the same, a spring tending normally to maintain said cover member in such position, said cover being shiftable to a position to reveal said mechanism, and means responsive to movement of said load receiving member and engaging said cover member to prevent the latter from occupying its normal position.

2. A scale including a load receiving member, a registering mechanism connected thereto and responsive to the movements thereof, a cover member extending adjacent said registering mechanism and occupying a position to conceal the same, a spring tending normally to maintain said cover member in such position, means responsive to movement of said load receiving member and engaging said cover member to prevent the latter from occupying its normal position and means for shifting said cover member to an abnormal position and at which said registering mechanism is revealed.

3. A scale including a load receiving member, a registering mechanism connected thereto and responsive to the movements thereof, a cover member extending adjacent said registering mechanism and occupying a position to conceal the same, a spring tending normally to maintain said cover member in such position, such cover member being shiftable to a position to reveal said mechanism, and a rockingly mounted lever connected to said weight receiving member and cooperable with said cover member to maintain the latter in mechanism-revealing position.

4. A scale including a load receiving member, a registering mechanism connected thereto and responsive to the movements thereof, a cover member extending adjacent said registering mechanism and occupying a position to conceal the same, a spring tending normally to maintain said cover member in such position, means whereby said cover member may be shifted to reveal said registering mechanism, a pivotally mounted lever engageable with said cover member to maintain the same in the latter position and a yielding contact member connecting said lever with said receiving member.

5. A scale including a load receiving member, a casing extending adjacent thereto, said casing being formed with a series of windows, shiftable cover members individual to each of said windows and normally occupying opening-concealing positions, registering mechanism connected to said load receiving member and responsive to movements thereof, means whereby such cover members may be individually shifted to reveal such registering mechanism and means connected to said load receiving member and cooperating with said cover members to maintain the same in such latter positions.

6. A scale including a load receiving member, a casing extending adjacent thereto, said casing being formed with a series of windows, cover members individual to each of said windows and normally occupying opening-concealing positions, registering mechanism connected to said load receiving member and responsive to movements thereof, means whereby said members may be shifted to reveal such registering mechanism, means connected to said load receiving member and cooperating with said cover members to maintain the same in such latter positions and means forming a part of said last named means whereby upon said load receiving member moving, each of said cover members will be released to occupy opening-concealing positions.

7. A scale including a load receiving member, a casing extending adjacent thereto, a registering mechanism within such casing and connected to said load receiving member to respond to movements of the latter, a plurality of covers normally obstructing vision of such registering mechanism, means whereby such covers may be shifted to permit a viewing of such registering mechanism, means for retaining the covers in such latter positions, and means coupled to said retaining means and common to all of the same to release such covers to positions at which they obscure such registering mechanism.

8. A scale including a load receiving member, a casing extending adjacent thereto, said casing being formed with a series of windows, cover members individual to each of said windows and normally in opening-concealing positions, springs coupled to said members to retain the same in such positions, means whereby such members may be selectively shifted to uncover such openings registering mechanism connected to said load receiving member and responsive to movements thereof, such registering mechanism lying adjacent such openings and being visible therethrough, means connected to said load receiving member and cooperating with said cover members to maintain the same in opening uncovering positions and means forming a part of said last named means whereby upon said load receiving member moving, each of said cover maintaining means will be released to allow said cover members to shift under the influence of said springs to their normal positions.

HAROLD L. WALKER.